(12) United States Patent
Buttross et al.

(10) Patent No.: US 7,478,748 B2
(45) Date of Patent: Jan. 20, 2009

(54) ACCESS CONTROL SYSTEM AND METHOD

(76) Inventors: Robert Buttross, 109 Rollingwood Dr., Natchez, MS (US) 39120; Donn Gore, 800 Shady Tree Ct., Danville, CA (US) 94523

( * ) Notice: Subject to any disclaimer, the term of this patent is extended or adjusted under 35 U.S.C. 154(b) by 913 days.

(21) Appl. No.: 10/929,233

(22) Filed: Aug. 30, 2004

(65) Prior Publication Data

US 2006/0048233 A1    Mar. 2, 2006

(51) Int. Cl.
*G06K 5/00*    (2006.01)
(52) U.S. Cl. ...................................... 235/382
(58) Field of Classification Search .................. 235/382
See application file for complete search history.

(56) References Cited

U.S. PATENT DOCUMENTS 5,140,317 A    8/1992   Hyatt, Jr. et al.
5,724,428 A    3/1998   Rivest
5,870,543 A *  2/1999   Ronning ....................... 726/33
6,317,025 B1   11/2001  Leon et al.

* cited by examiner

*Primary Examiner*—Daniel A Hess
(74) *Attorney, Agent, or Firm*—Robert L. Waddell (57) ABSTRACT

Access control devices are implemented at an access point of a plurality of remote properties. Each access control device has information unique to the access control device including the access control device unique identifier as well as a time determined, by an internal clock located at each access control device. A user can obtain a generated electronic key by forwarding a requesting application to a key generation system. The key generation system will generate the key and return it to the user for input to the access control device at the user desired property. The requesting application may comprise a property identifier indicative of an access control device at the user desired location. When generating the electronic key, the key generation system executes an encryption algorithm to convert some of the information in the requesting application into cyphertext.

20 Claims, 8 Drawing Sheets

ACCESS CONTROL SYSTEM AND METHOD

FIELD OF THE INVENTION

This invention relates to systems and methods to provide access to remotely located properties. More particularly, the present invention relates to a system and method to facilitate providing access by generating an electronic key through a network, which electronic key can be used on access control devices to gain access to properties located in remote locations.

BACKGROUND OF THE INVENTION

In the past, users seeking access to remotely located properties, such as renters seeking to rent vacation properties, or other types of properties for various periods of time, would need to reserve a property, and then visit a management company in order to obtain a key to access the property. The user would then proceed to the remotely located property. This necessitated the management company being open for extended periods of time to accommodate the users of the rental property. This also necessitated the users physically visiting the management company, which often times is remotely located from the desired property being rented, and, then travelling to the desired property being rented.

Accordingly, in the past, there were generally at least two steps required to obtain access to a rental property. These included the initial step of the user and property management company communicating for the purposes of reserving the rental property a number of days in advance and for a predetermined period of time, and, the second step of the user physically visiting the management company to obtain a means of access to the property. This involves a number of interactions between the user and the management company increasing the inefficiency, cost and inconvenience for both the user and the property management company.

Accordingly, there is a need in the art for a system and method to facilitate gaining access to remotely located properties. There is also a need in the art for a system and method to facilitate property management companies managing properties separated by greater distances in a wider geographic region.

SUMMARY OF THE INVENTION

Accordingly, it is an object of this invention to at least partially overcome the disadvantages of the prior art. Also, it is an object of this invention to provide an improved type of method and system to access properties. Accordingly, in one of its aspects, this invention resides in a property management system for providing users access to properties at remote locations, said system comprising:

a key generation system for generating electronic keys in response to a requesting application from users, said requesting applications comprising a property identifier identifying a user selected property and a time identifier identifying when the user desires access to the user selected property, said key generation system comprising an encryption algorithm for encrypting information contained in the requesting application;

an access control device at each property for providing access to the property, each access control device having an access control identifier identifying the access control device and corresponding to the property identifier of the property to which the access control device can provide access, each access control device comprising a decryption algorithm, an internal clock for determining time and date, and an input method permitting the user to input an electronic key;

a network through which the user may access the key generation system to submit the requesting application and receive generated electronic keys;

wherein the key generation system receives the requesting application though the network from the user and using the encryption algorithm generates a generated electronic key which is forwarded to the user through the network, said generated electronic key containing encrypted information corresponding to at least the property identifier and the time identifier;

wherein upon the user inputting the generated electronic key into the input method of the access control device located at the user selected property, the access control device decrypts the generated electronic key using the decryption algorithm to extract the property identifier and time identifier, and said access control device permits the user access to the user selected property, if, and only if, the property identifier extracted from the generated key corresponds to the access control device identifier for the access control device at the user selected property, and, the time and date determined by the internal clock of the access control device at the user selected location is greater than the time identifier.

In a further aspect, the present invention resides in a method for providing users access to properties at remote locations, said method comprising:

inputting a requesting application by a user to a key generation system through a network, said requesting application comprising a property identifier identifying a user selected property selected from a plurality of properties which can be accessed by users by means of the key generation system, and, a time identifier identifying when the user desires access to the user selected property;

generating a generated electronic key by the key generation system utilizing an encryption algorithm, said generated electronic key containing encrypted information corresponding to at least the property identifier and the time identifier;

inputting the generated electronic key by a user into an access control device located at the user selected property;

decrypting, by the access control device at the user selected property, the generated electronic key using a decryption algorithm to extract information from the generated electronic key, said extracted information comprising the property identifier and the time identifier;

comparing at the access control device the property identifier to an access control device identifier identifying the access control device at the user selected property, and, comparing the time identifier to time and date determined by an internal clock at the access control device; and providing the user access to the user selected property if, and only if, the property identifier corresponds to the access control device identifier for the access control device at the user selected property, and, the time and date determined by the internal clock of the access control device at the desired location is greater than the time identifier.

In still further aspect, the present invention provides a property management system for providing users access to properties at remote locations, said systems comprising:

at each property, an access control device for providing access to the property, each access control device comprising a decryption algorithm for converting cyphertext into plaintext, access information and a comparing unit for comparing the plaintext to the access information;

a key generation system for generating electronic keys to provide a user access to a user selected property in response to a requesting application from a user, said requesting application containing information regarding the user selected property, said key generation system comprising an encryption algorithm for converting plaintext into cyphertext;

a network through which users may access the key generation system to submit the requesting application and receive generated electronic keys;

wherein upon the key generation system receiving a valid requesting application from a user through the network, the key generation system generates a generated electronic key by utilizing the encryption algorithm to convert at least a portion of the information contained in the requesting application from plaintext to cyphertext to be contained in the generated electronic key, and forwards the generated electronic key to the user through the network;

wherein upon the user inputting the generated electronic key into the input method of the access control device located at the user selected property, the access control device utilizes the decryption algorithm to convert the cyphertext contained in the generated electronic key to plaintext; and wherein the comparing unit in the access control device compares the plaintext from the generated electronic key with its access information and said access control device permits the user access to the user selected property, if, and only if, the access information corresponds to the plaintext from the generated electronic key.

Accordingly, in one embodiment, the present invention provides an advantage in that the user may obtain access to a number of remotely located properties by obtaining a generated electronic key through a network. The generated electronic key may be used for any one property that the user has selected of a plurality of properties being managed by the property management company.

A further advantage of a further embodiment of the present invention is that the property management company need not be located near the desired properties at least because the user need not visit the property management company in order to obtain a "key" permitting access to the property, but rather the user can obtain an electronic key through a network, which enables the user to access the property. In this way, the user's flexibility has been greatly increased and the geographic area that the property management company may manage for rental can increase. Furthermore, by allowing the user to obtain a generated electronic key that provides the user access to the user selected property through a network, the user may proceed directly to the user selected property without physically visiting the management company which is more efficient and convenient for the user. Furthermore, by the user being able to visit the user selected property directly without visiting the management company, the hours of operation, location and overhead costs of operating the management company decrease. Furthermore, the management company may manage properties in a wider geographic region in part because the user need not travel to the management company prior to accessing the user selected property.

A further advantage of the present invention is that the network may be an internet protocol network, such as the Internet and/or World Wide Web. This facilitates Internet-based travel and can facilitate online travel by permitting selection, reservation and obtaining of a generated key at the same time.

A further advantage of the present invention is that the generated electronic key can take on any number of forms. In a preferred embodiment, these features include a numeric code which is entered into the access control device at the user selected property, an electronic access code which is stored electronically onto a mobile device such as a cell phone or personal digital assistant (PDA), or a code that is stored on a message storage device, such as a disk, memory strip, memory stick or compact disc.

A further advantage to the present invention is that communication between the various elements in the systems can be performed through encryption. Furthermore, in a preferred embodiment, the encryption algorithm used to generate the electronic key provided to the user and the matching decryption algorithm used to de-encrypt the electronic key used by the access control device at the user selected property operate on symmetric cryptography thereby improving security of the overall system.

A further advantage of the present invention is that the existing system and method can be implemented on existing properties. For instance, the access control device can be retrofitted onto access points of existing properties without damage to the access point, such as doors or windows. In a preferred embodiment, the access control device need not receive any code to be re-programmed after installation, except for routine maintenance.

A further advantage of the present invention is that the property management system may be integrated with third party systems to provide extra services to the users. For instance, the management property services can be integrated to provide specific access to other facilities at the user selected property and/or provide other services, such as, access to spa services, pools, boat docks, exercise rooms, sporting events, locker rooms, restrooms, storage containers, storage facilities, etc.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention:

FIGS. 3C-a and 3C-b are each a high level flow chart illustrating generation of the electronic key by the electronic key server according to a further preferred embodiment of the present invention;

DETAILED DESCRIPTION OF THE PREFERRED EMBODIMENTS

In one embodiment, the present invention utilizes an electronic key generated by an electronic key server. The present system in a preferred embodiment provides a cryptographic standard facilitating time based control over remotely located devices with little or no pre-programmed codes. The electronic key server and the generated electronic keys in combination with the access control devices of the present invention in a preferred embodiment provide the ability to control user access to remotely located properties with little to no additional programming after the initial set-up. Once an access control device is programmed with specific device information and placed into service, it need only be touched again for the purpose of periodic maintenance and for audits. There are no codes to compromise or delete in the access control devices.

In a preferred embodiment, the present system provides increased security and flexibility where access control is needed for a specific user and for a predetermined period of time. For example, an electronic key may be generated for a specific access control device beginning on a specific date and time and is valid for a specific duration; each variable being defined at the time an electronic key is generated. No codes are programmed into the access control device. Rather, the access control device evaluates the validity of the electronic key at the time of use.

In a preferred embodiment, the present invention is based on Secret Key Cryptology, also sometimes referred to as symmetric cryptography. In this type of Secret Key Cryptology or symmetric cryptography, each device is embedded with a "key" and the electronic key server also contains a matching "key", whether Internet based or installed. In a preferred embodiment of the present invention, each access control device has several variables, such as date and time controlled via an internal clock as well as a lock ID or access control device id identifying the access control device, programmed into each access control device to add an additional level of complexity to the generated electronic key.

In a preferred embodiment, the present system utilizes the RC5 encryption algorithm developed by Ron Rivest for RSA Laboratories. The RC5 is a symmetric block utilizing a variable word size, a variable number of rounds, and a variable-length secret key. These parameters can be adjusted to meet different goals for security, performance and exportability. The exact key, bit length and number of rounds used in the generation of an eKey are confidential.

Several aspects of the RC5 encryption algorithm are disclosed in U.S. Pat. No. 5,724,428 entitled "Block Encryption Algorithm With Data Dependent Rotation" which issued on Mar. 3, 1998, the subject matter of which is incorporated herein by reference. Similarly, aspects of encryption algorithms are disclosed in U.S. Pat. No. 5,035,600 entitled "Apparatus for Converting Thermoplastic Blanks Into Shaped Articles", issued Jul. 30, 1991 and U.S. Pat. No. 5,214,703 entitled "Device for the Conversion of a Digital Block and Use of Same", issued May 25, 1993. The subject matter of both hereby incorporated by reference.

In a preferred embodiment, the electronic key generated by the RC5 encryption algorithm according to one preferred embodiment has more than 73 billion possible combinations for any given period of time. This was achieved utilizing the RC5 encryption algorithm with a 64 bit encryption key and six unique variables, such as lock ID, start time, duration, start date, end time and code type in the generation process, according to one preferred embodiment.

The variables used in the electronic key generation process are specific to the dates required for access to the user desired property. The start date may be any valid calendar date up to 365 days and the duration may be any integer indicating the number of days the electronic key will be valid. Similarly, the start times and end times may be any integer between 00 and 23 or other types of values indicating time.

The present system also provides the ability to select the type of code to use standard or maintenance or daily access. For instance, standard codes used by renters can have access between 1 and 250 days and any combination of start and stop times and any number of times per day. By contrast, maintenance codes used by maintenance users may be limited to one day and provide access for as low as 2 hours and as much as 24 hours, as well as limit the number of times access is provided.

An electronic key can then be generated using these variables and the encryption key. The electronic key will be a multi-digit code having any number of digits, but preferably 10 digits may be used. This electronic key can then be provided to the user who can then use the code to gain access to a user desired property through the access control device. When the electronic key is inputted to the electronic control device, it is checked for validity and then further checked to confirm that the property identifier for the user selected property corresponds to the access control device identifier for the access control device at the user desired property. Furthermore, in a preferred embodiment, the access control device may also check the start date and start time of the electronic key against the current time to ensure that it is greater than the current time generated by the internal clock of the access control device.

In the preferred embodiment, as outlined above, if the electronic key is a 10 digit code, there are potentially 6.8328e17 possible combinations for the electronic key. This can be calculated by determining that for a 10 digit code, there are 10 possible numbers, 65000 ID numbers, 365 days, 255 days of duration, 24 start times, 24 end times, 2 codes providing $((10^{\wedge}10))*65000*365*250*24*24*2)=6.8328e17$. If this is combined with the fact that each access to an access control device during the designated access period will require one second, it will take roughly 433,333,333,333,333 years to attempt all of the possible codes for one access control device.

For convenience, the following non-limiting definitions are to be used when construing and/or interpreting the claims and the disclosure to the extent permitted by applicable law:

Encryption: Any process including an algorithm for converting readable information, also sometimes referred to as plaintext, into unreadable information, also sometimes referred to as Cyphertext.

Plaintext: Readable information including information that is readable by humans and also information that is readable by machines without the use of a cipher, decryption algorithm or other type of decryption or encryption algorithm.

Cyphertext: Unreadable information by humans or machines without the use of an algorithm including decryption algorithms, block ciphers, and other types of ciphers and decryption algorithms.

Block Cipher: A mathematical function that takes two inputs and produces one output.

Algorithm: A computational procedure used to hide and unhide information, comprising encryption algorithms and decryption algorithms including ciphers and block ciphers to convert plaintext into cyphertext.

Encryption Key: A value that may cause some algorithms to run in a specific way and convert plaintext into specific types of ciphered text and also convert ciphered text into specific types of plaintext.

Preferred embodiments of the invention and its advantages can be understood by referring to the present drawings. In the present drawings, like numerals are used for like and corresponding parts of the accompanying drawings.

Figure 1:
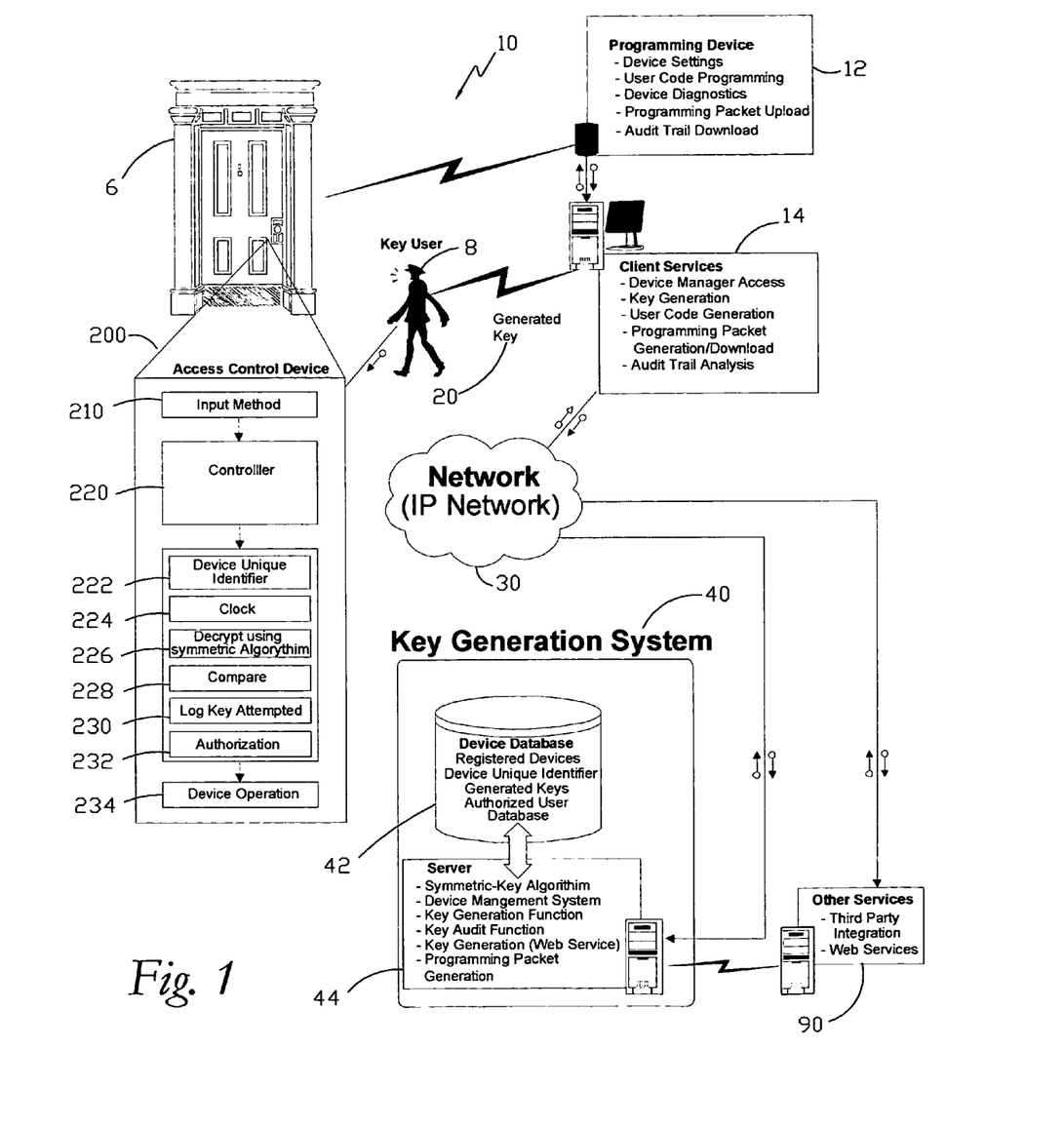
FIG. 1 illustrates a schematic diagram of the property management system according to one preferred embodiment.

As shown in FIG. 1, one embodiment of the present invention relates to a property management system, as shown generally by reference numeral 10. The property management system 10 may provide users, identified generally by reference numeral 8, access to properties, one of which is identified by reference numeral 6, at remote locations. It is understood that although FIG. 1 illustrates a single user 8 and a single desired property 6, the system 10 may be used by a large number of users 8, rather than a single user 8 to obtain access to a plurality of different properties 6, at least some of the properties 6 located at remote locations in a wide area.

The property management system 10, in a preferred embodiment, comprises a key generation system, as shown generally by reference numeral 40. The key generation system 40 can generate electronic keys, as shown generally by reference numeral 20, which can provide a user 8 access to a user selected property 6, as shown generally by reference numeral 6 in FIG. 1. It is understood that the user selected property 6 may be one property 6 selected by a particular user 8 from the plurality of properties 6. The user 8 can obtain the generated key 20 by submitting, in one preferred embodiment, a requesting application 300 as discussed in more detail below with respect to FIGS. 3A, 3B 3C-a and 3C-b . The requesting application 300 can be submitted by the user through a network, shown generally by reference numeral 30, to the key generation system 40. It is understood that the network 30 can be any type of network or combination of different types of networks. Preferably, the network 30 is an internet protocol (IP) network. For instance, the network 30 may be an Internet, Intranet, a World Wide Web, a Local Area Network, a Wide Area Network and workstations. The network 30 may also be a wide area network 30. In essence, the network 30 can be any type or types of network which facilitates the transmission of information such as the requesting application 300 and the generated electronic key 30 to and from the user 8 and a key generation system 40. Likewise, the user 8 may access the network 30 by any known means appropriate to the network 30. For instance, where the network 30 is the World Wide Web, the user 8 may access the network 30 by means of a web browser (not shown) on a computer or personal digital assistant (PDA) (not shown). Also, the user 8 may access the network 30 through a client server 14. The client server 14 may be a kiosk or any other device (not shown) for facilitating the user 8 access to the network 30. It is understood that the key generation system 40 will be generally located remotely from the user 8 as well as the plurality of properties 6.

The requesting application 300 may be submitted to the key generation system 40 through the network 30. To facilitate this, the key generation system 40 may comprise a device database 42 and a server 44. The server 44 also may comprise a key generation function and a key generation "web service" when the network 30 comprises the World Wide Web. The generated electronic keys are transmitted from the server 44 through the network 30 to the user 8 in a controlled and secure method using, in a preferred embodiment, a secure XML package generated by the programming package generation. The server 44 also preferably comprises a device management system, which manages the key generation system 40.

Preferably, each property 6, which is under the management of the property management company will have an access control device 200 which can provide access to the corresponding property 6. As illustrated in FIG. 1, the access control device 200 according to one embodiment will have the input method 210 permitting input by the user 8 of information, including the generated electronic key 20. The generated key 20 can be inputted through the input method 210 to an access control device 200 located at the user selected property 6 to gain access to the user selected property 6. The access control device 200 may also have a controller 220 for controlling the other functions of the access control device 200 including the internal clock 224, the decrypt using symmetric algorithm 226, the comparing unit 228, the log key attempted 230 and the authorization 232. The access control device 200 will also preferably comprise a device operation 234, which mechanically and/or electronically provides the user with access to the property 6 such as by disengaging a lock and/or disengaging a security system and/or providing a sliding door or sliding window access to the property 6.

In operation, the user 8 submits the requesting application 300 through the network 30 to the key generation system 40. Once the key generation system 40 receives a requesting application 300, the key generation system 40 will validate the requesting application 300 by determining if the user 8 is a valid user and if information contained in the requesting application 300 is valid. Upon confirmation of receipt of a valid requesting application 300, the key generation system 40 will commence to generate a generated electronic key 20. The device database 42 comprises information regarding the registered access control devices 200, the device unique identifiers 222 for each of the access control devices 200 on each of the properties 6 under the management of the property management system 10, which keys have been generated for specific properties 6 and the authorized user database indicating the users 8 which are authorized to access the device database 42. Upon receipt of the requesting application 300, the server 44 confirms the user 8 as an authorized user by accessing the authorized user database in the database 42 and confirms that the received requesting application 300 is valid. The key generation server 44 then generates the electronic key 30 by means of the symmetric key algorithm which encrypts at least some of the information contained in the requesting application 300 utilizing the symmetric-key algorithm.

The requesting application 300 in a preferred embodiment, will comprise, amongst other information, a property identifier, shown as property ID or lock ID in the drawings, identifying the user selected property 6 and also a time identifier, identifying the date and/or time when the user desires access to the user selected property 6. In a preferred embodiment, the generated electronic key 20 comprises, amongst other information, encrypted information corresponding to at least the property identifier property ID and the time identifier start time/start date. Once the user 8 has the generated key 20, the user 8 can input the generated key 20 to the access control device 200 such as through the input method 210. Upon input of the electronic key 20, the access control device 200 will permit the user 8 access to the user selected property 6 by extracting the property identifier property ID and the time identifier start date/start time from the generated electronic key 20 using the decryption algorithm 226. The access control device 200 will operate the device operation 234 and permit the user access to the user selected property 6, if, and only if, the property identifier property ID extracted by the access control device 200 using the decryption algorithm 226 from the generated key 20 corresponds to the access control device unique identifier 222, and, the time and date determined by the internal clock 224 of the access control device 200 is greater than the extracted time identifier start date/start time extracted from the generated key 20.

Figure 2:
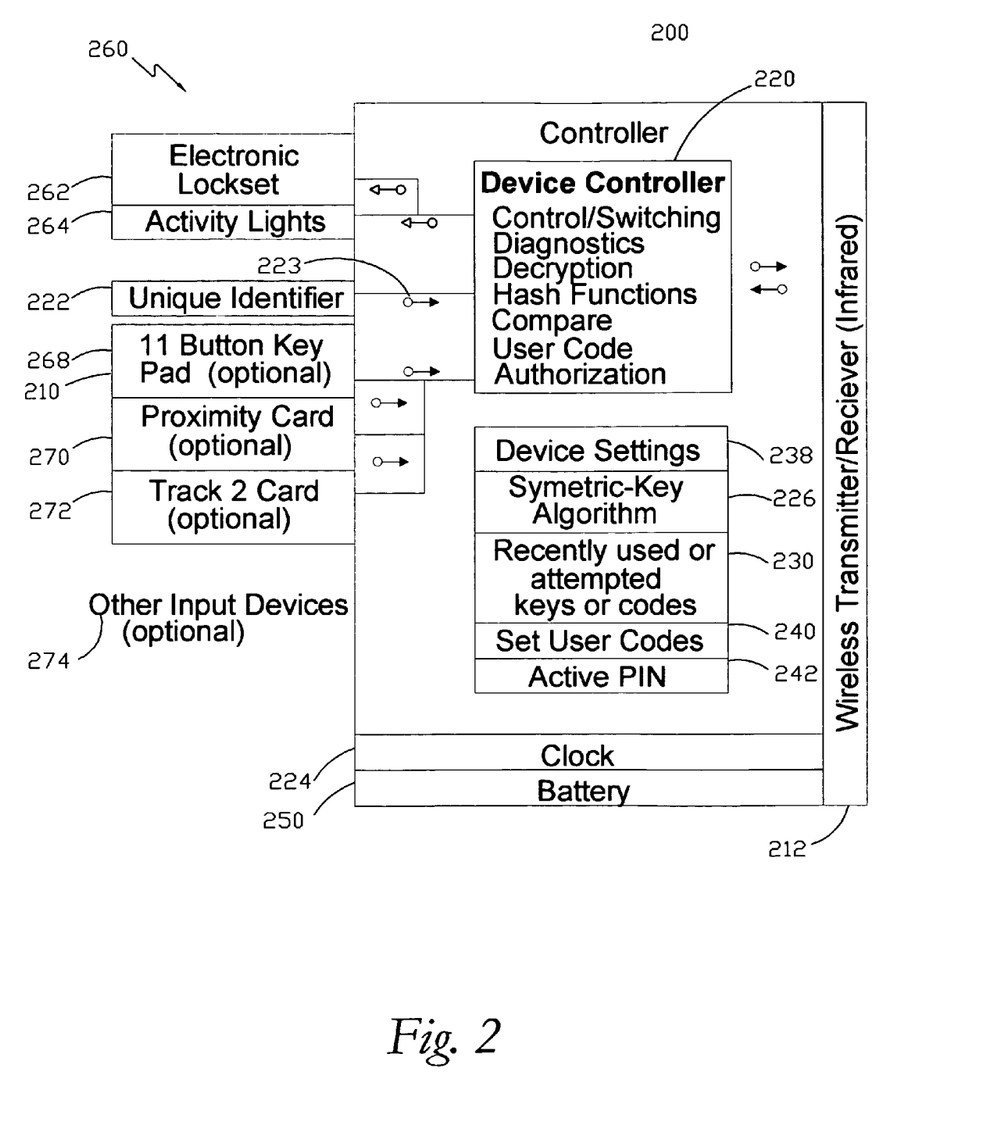
FIG. 2 is a symbolic representation of an access control device which can be connected at each property managed by the property management system according to one preferred embodiment.

FIG. 2 illustrates a more preferred embodiment of the access control device 200. As illustrated in FIG. 2, the access control device 200 comprises a controller 220 which controls the switching, diagnostics, decryption, hash functions, comparing functions and user code authorization functions. In particular, the controller 220 may be connected to input/output devices 260 such as the electronic lock set 262 and activity lights 264. The device controller 220 is also preferably connected to the input method 210, which is illustrated in FIG. 2 as being an 11 button key pad according to a preferred embodiment. The device controller 220 also receives the unique identifier 222 from an input 223. It is understood that the unique identifier 222 may be inputted to the device controller 220 periodically. As illustrated in FIG. 2, the access control device 200 may contain several optional input/output devices including a proximity card 270, a track 2 card 272, and other input devices 274.

Preferably, the access control device 200 will comprise a battery 250 for providing power to the controller 220 so the access control device 200 may perform its functions. Optionally, the access control device 200 may also be connected to a power source and/or have other means of recharging such as through photovoltaic cells.

As illustrated in FIG. 2, the access control device 200 will have the symmetric-key algorithm 226 for converting the generated electronic key 20 inputted into the input method 210 by the user into plaintext from cyphertext so that the property identifier and time identifier, as well as other information encoded in the generated electronic key 20, may be extracted. The access control device 200 may also have an active PIN 242 in said user codes 240 to provide recurring access to a specific person, such as the owners of the property 6 and/or maintenance or housekeeping staff. Similarly, the access controller device 200 will have device settings 238 which may be optionally set by the owner of the property 6 and/or the administrator of the property management system 10.

The controller 220 may also communicate to a programming device 12 by means of a wireless transmitter/receiver (infrared) 212.

It is understood that in a preferred embodiment, the access control device 200 can be retrofitted onto an existing access point to a property 6. For instance, the access control device 200 may be connected to an electronic lock mechanism or other type of locking device such that, once a generated electronic key 20 has been authorized, the device operation 234 can simply access the lock mechanism to permit the user access to the property 6. In other embodiments, access points, such as doors can be manufactured with an access control device 200. In still further embodiments, such as where the property 6 is a locker, storage facility or storage container, the access control device may be incorporated into the entry point, such as the door or gate, which provides access to these types of properties 6.

Figure 4:
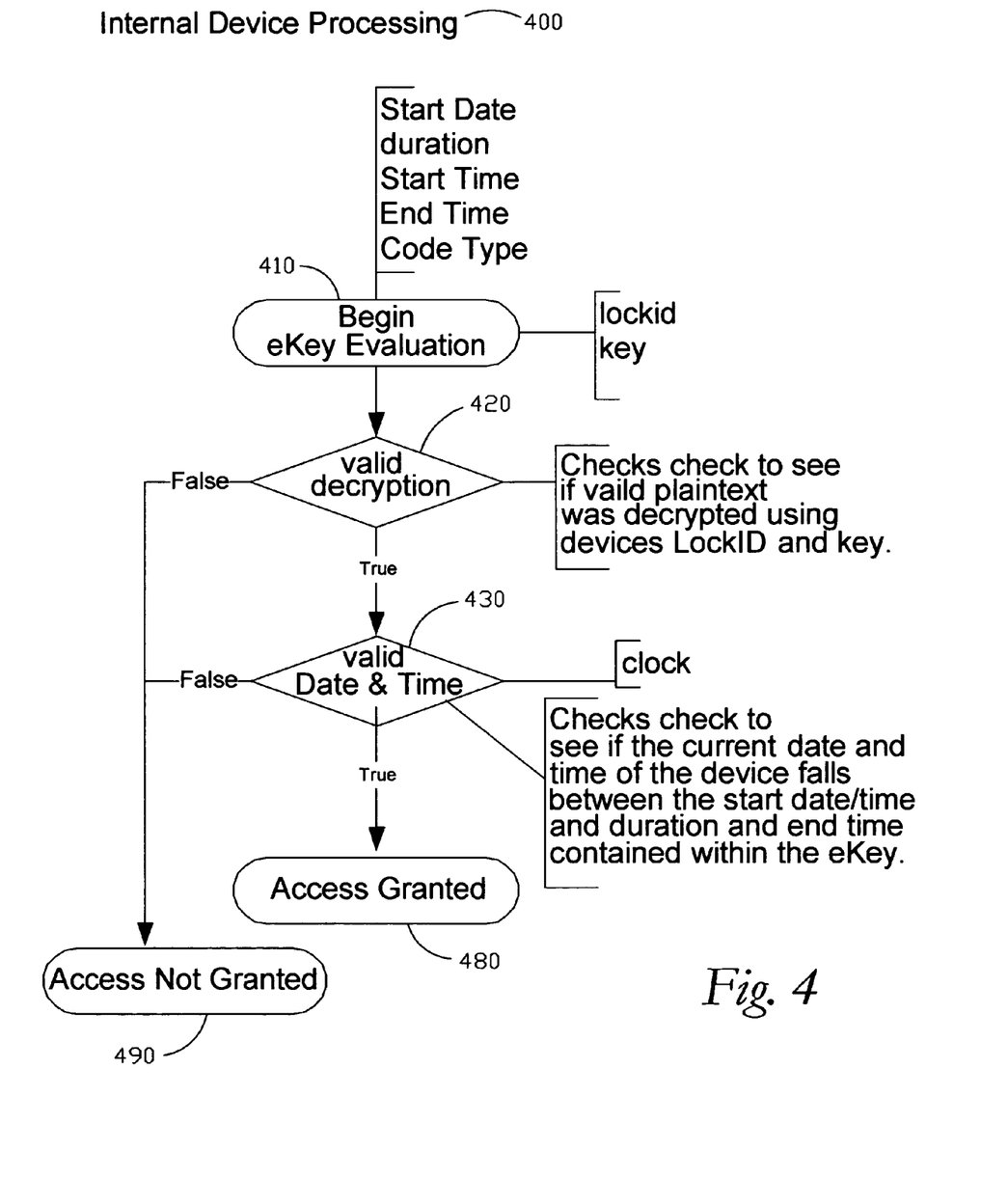
FIG. 4 is a high level flow chart illustrating the internal processing of the generated electronic key by the access control device according to one preferred embodiment of the present invention.

FIG. 4 illustrates a high level flow chart of the internal processing 400 of the generated electronic key 20 by the access control device 200 according to one preferred embodiment of the present invention. As illustrated in FIG. 4, the first step of the internal device processing 400 is to begin the electronic ekey evaluation at step 410. The electronic ekey will comprise, according to a preferred embodiment, a number of digits which is a cyphertext of the property identifier property ID or lock ID, the encryption key 52 which the decryption using symmetric algorithm 226 will use to decrypt the generated electronic key 20, as well as the start date, indicating the date and the time the user 8 has access to the device, the duration identifier indicating the duration from the start date and start time the user has access to the property 6, the end time indicating the end of the time the user has access to the property and, in a preferred embodiment, the code type identifier. The code type identifier identifies the nature of the user having access whether it is a standard user or a maintenance user.

At "begin ekey evaluation" (step 410), the decrypt using symmetric algorithm 226 will convert the generated electronic key 20 which, in a preferred embodiment, comprises cyphertext of at least some of the above-noted information, into plaintext. At the valid ekey step 420, a further check will be made to see if the valid plaintext, consisting of the extracted information from the generated key 20 was decrypted using the encryption key and the property identifier property ID or lock ID. If at this step either one of these checks or validation steps fail, the access control device 200 will deny access to the property 6 at step 490. If both of these checks or validations are true, then the internal device processing 400 will proceed to the next step 430 which checks to see if the current date and time as generated by the internal clock 224 of the access control device 200 falls between the start date/start time and the duration and end time contained within the information extracted from the generated electronic key 20. This step 430 may include several sub-steps. For instance, the step 430 may initially check to ensure that the time and date determined by the internal clock 224 of the access control device 200 at the user desired location is greater than the time identifier, namely the start date/start time, extracted by the decryption algorithm 226 of the access control device 200. If this is false, then access will be denied in step 490. If this is true, then access will be permitted at step 480. An additional sub-step 430 may include determining if the time and date of the internal clock 224 is less than the time identifier of the start time, namely date and time plus the duration identifier. If this false, then it indicates that the duration for which the user had access to the user selected property 6 has expired and the user will be denied access at step 490.

Figure 5:
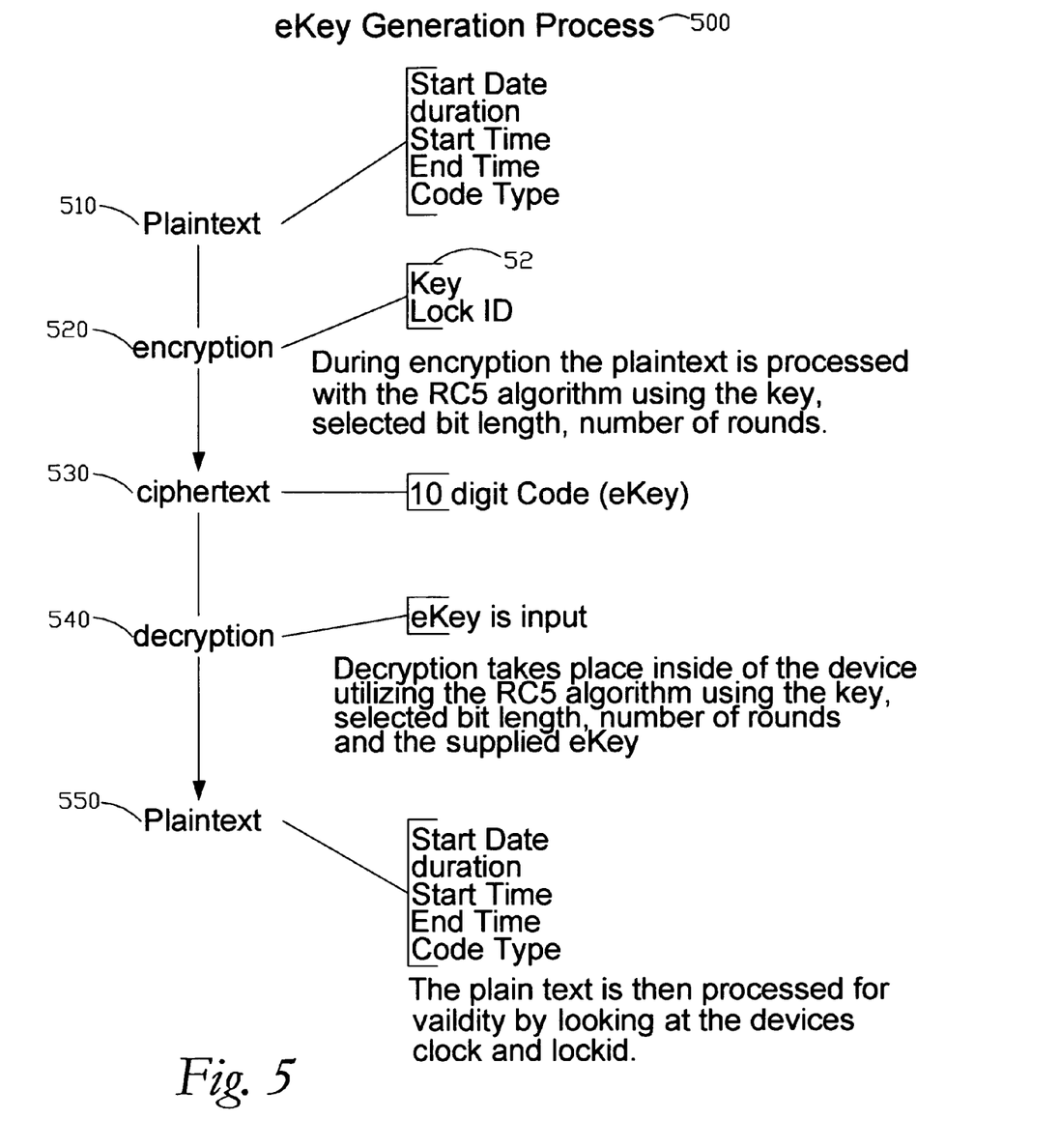
FIG. 5 is a flow chart illustrating the electronic key generation and the generated electronic key decryption according to one preferred embodiment of the present invention.

FIG. 5 is a high level flow chart illustrating the electronic key generation and the generated electronic key decryption according to one preferred embodiment of the present invention. As illustrated in FIG. 5, plaintext 510 representing, in a preferred embodiment, the start date, duration, start time, end time and code type are initially collected. This can be done by the key generation system 40 and in particular the key generation function of server 44. The encryption algorithm 520 may also comprise an encryption key 52 as defined above. This information can be obtained, for instance, from the requesting application 300. Then, the plaintext 510 will be converted into cyphertext 530 by the encryption algorithm 520 which, in a preferred embodiment, is implemented by the symmetric key algorithm of server 44. The encryption algorithm 520 may be any type of encryption algorithm 520 as is known in the art. In a preferred embodiment, as discussed above, the encryption algorithm 520 will comprise a RC5 algorithm using an encryption key as well as a selected bit length and a number of rounds. During the encryption process 520, the plaintext 510 is processed and encrypted to form the cyphertext 530 which corresponds to the generated electronic key 20 in one preferred embodiment. In a preferred embodiment, the cyphertext 530 may consist of a 10 digit code, but it is understood that the electronic key may have any number of digits. This electronic key 20 will then be transferred from the key generation system 40 to the user 8. Once the user 8 inputs the cyphertext 530 corresponding to the generated electronic key 20 into the input method 210 of the access control device 200, the decrypt using symmetric algorithm 226 in the access control device 200 will perform the decryption step shown at step 540. The decryption 540 takes place inside of the access control device 200, again preferably utilizing the RC5 algorithm using the key, selected bit length, number of rounds and the supply generated electronic key 20. In a preferred embodiment, the decryption 540 comprises a block cipher having two inputs and one output. In all cases, the output will constitute plaintext 550.

It is understood that the plaintext 550 should, if the correct encryption 520, decryption 540 and electronic key 20 have been entered into the correct access control device 200, correspond to at least some of the plaintext 510. In particular, the plaintext 550 will preferably comprise the start date, duration, start time, end time and code type.

It is understood that the cyphertext 530 will preferably contain information, which can be extracted by the decryption 540 representing the access control identifier 222 as well as the time identifier, namely start date and start time. The access identifier 222 and the time identifier start date and start time will be used as additional information which must be validated prior to permitting access to the user 8 as illustrated in FIG. 4 by the internal device processing 400. Preferably, the property identifier property ID will be indicative of the access identifier 222 on the user desired property 6. In this way, the access control device 200 will compare using the comparing unit 228, the property identifier property ID against the access identifier 222 contained in the access control device 200 to further confirm the validity of the generated electronic key 20. The comparing unit 228 will also confirm the validity of time identifier against the time and date determined by the internal clock 224.

In a preferred embodiment, the access control device 200 will comprise a log key attempted 230 which keeps a record of all of the generated electronic keys 20 which are inputted to the input method 210 of each access control device 200. This is done for security and auditing purposes. The log key attempted 230 may periodically downloaded through the wireless connection 212 to the programming device 12. The device settings, user code programming device diagnostics and programming packet upload may also be communicated to and from the access control device 200 from the programming device 12 such as by means of the wireless transmitter/receiver 212. As also illustrated in FIG. 2, in a preferred embodiment, the access control device 200 may also have a recently used or attempted keys or codes 230 to keep a record of the most recently attempted generated electronic keys 20 or codes.

Figure 3A:
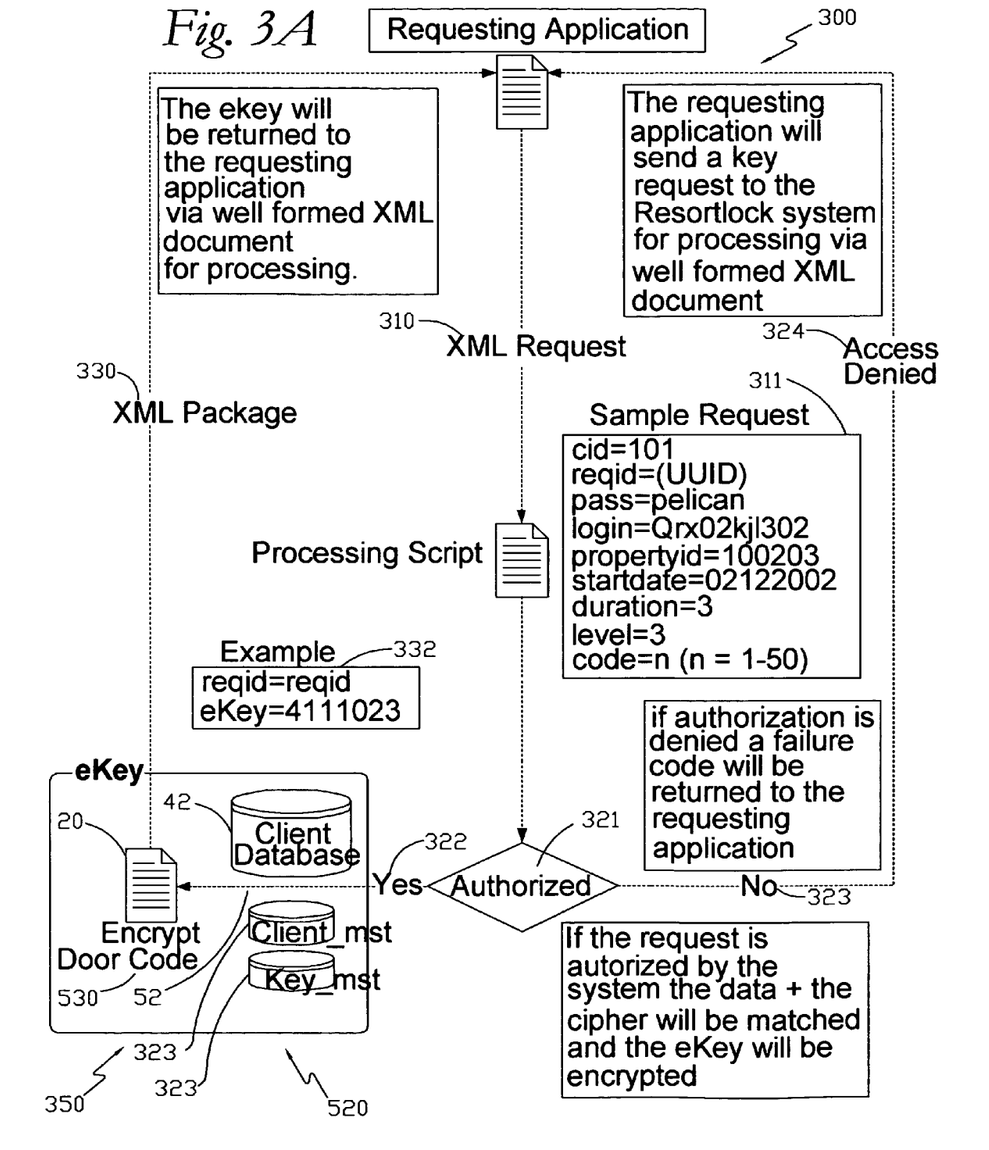
FIG. 3A is a high level flow chart illustrating submission of the requesting application form and obtaining an electronic key from the electronic key server through a network according to one preferred embodiment of the invention.

As illustrated in FIG. 3A, in a preferred embodiment, the requesting application 300 will contain information as illustrated by the sample request 311. The information contained in the requesting application 300 preferably includes:

(computer identifier) cid=101
(request application identifier) reqid=(UUID)
(password) pass=pelican
(login for user 8) login=Qrx02kjl302
(property identifier for the user desired 6) property ID=100203
(time identifier) start date=02122002
(duration identifier) duration=3
(access level) level=3
(user code) code=n(n=1-50)

As indicated above, the requesting application 300 may, in a preferred embodiment, comprise a number of types of information 311. However, preferably the requesting application 300 will comprise at least some information which can be independently verified by the access control device 200 such as the property identifier property ID which also is intended to correspond to the access control device unique identifier 222, also referred to as the lock ID. The sample request 311 also preferably comprises the time identifier start date and the duration identifier duration, which can be independently determined by the comparing unit 224 comparing this value to the value determined by the internal clock 224. The request identifier reqid is used to assist in tracking the requesting application 300 through the system 10. Similarly, the computer identifier cid, password pass and login are used to assist in the authorization step 321 for the key generation system 40 discussed below.

FIG. 3A is a high level flow chart illustrating submission of the requesting application 300 in obtaining a generated electronic key 20 from the electronic key server 40 according to a preferred embodiment of the present invention. As illustrated in FIG. 3A, the requesting application 300 is submitted by a user through an XML request 310 assuming the network 30 is an IP protocol network. The XML request 310 will comprise processing script 320 which is received by the key generation system 40. As discussed above, the server 44 of the key generation system 40 may comprise a key generation web server to facilitate submission of the requesting application 300. Once the requesting application 300 has been received by the key generation system 40, the server 44 will either yes authorized (step 322) or no authorized (step 323) at step 321. If authorization is no 323, then access will be denied 324. In this case, a failure code will be returned to the user 8 who submitted the requesting application 300. All the other steps associated with requesting application will then be discontinued.

If, at step 321, the requesting application 300 is authorized yes 322, then the key generation system 40 will commence a generated electronic key 20. The generated electronic key 20 will preferably comprise cyphertext 530 containing at least some of the information contained in the sample request 311. As indicated in FIG. 3A and also discussed above, the generated electronic key 20 will comprise the cyphertext 530 which will be created in part by the data plus the cipher key 52 at step 350. This will also be stored in the client database 42. The client-MST and the key-MST 540 and 541 contain information on the client and the cipher key 52 being used to generate the generated electronic key 20. The generated electronic key 20 will then be placed in an XML package 330 and returned to the user 8 who submitted the requesting application 300 for processing. It is understood that the XML package 330 may be generated by the programming package generation of the server 44 or by any other XML packaging system. It is also understood that if the network 30 is other than an IP network, a different type of packaging may be used to transfer the generated electronic key 20. In any case, it is preferred that the generated electronic key is transferred through a secure connection.

As illustrated in FIG. 3A, in one embodiment, the generated electronic key is shown by example 332. As illustrated in example 332, the generated electronic key will be identified by the request application identifier (REQ ID). Also, the electronic key may comprise any number of digits. In this example, the generated electronic key comprises seven digits, namely "4111023". These are the digits, which can be inputted by the user 8 into the input method 210 of the access control device 200 to attempt to gain access to the user desired property 6. It is also understood that these digits may comprise cyphertext 530 representative of information in the requesting application 300. It is also preferred that this generated electronic key 20 comprises cyphertext 530 indicative of information which can be independently confirmed by the access control device 200. Such information that can be independently confirmed by the access control device 200 and may preferably comprise the device unique identifier 222 for the access control device 200. Preferably, the information that can be independently authorized by the access control device 200 is contained in cyphertext of the electronic key 20 also comprises the start time and date and also the duration.

As indicated above, the access control device 200 will preferably comprise a controller 220 including a comparing unit 228 which is compare the property identifier property ID in FIG. 3A extracted from the cyphertext 530 contained in the generated electronic key 20 and compare this extracted property identifier to the access control device unique identifier 222 which has been independently and previously stored in the access control device 200. Furthermore, the access control device 200 will determine the present time by means of the internal clock 224 and the comparing unit 228 will compare the present time to the start time and date which has also been extracted from the cyphertext 530 of the generated electronic key 20. If the extracted time and date from the generated electronic key is greater than the current time and date as determined by the internal clock 224, the comparing unit 228 will validate the electronic key 20 and allow the user 8 access to the user desired location 6 as discussed also above. The user 8 will have access to the user desired location 6 for the duration specified in the generated key 20. In other words, as also discussed above, the user will only have access to the user desire location 6 while the time and date determined by the internal clock 224 is less than the start time and date plus the duration as extracted from duration identifier in the generated electronic key 20.

Figure 3B:
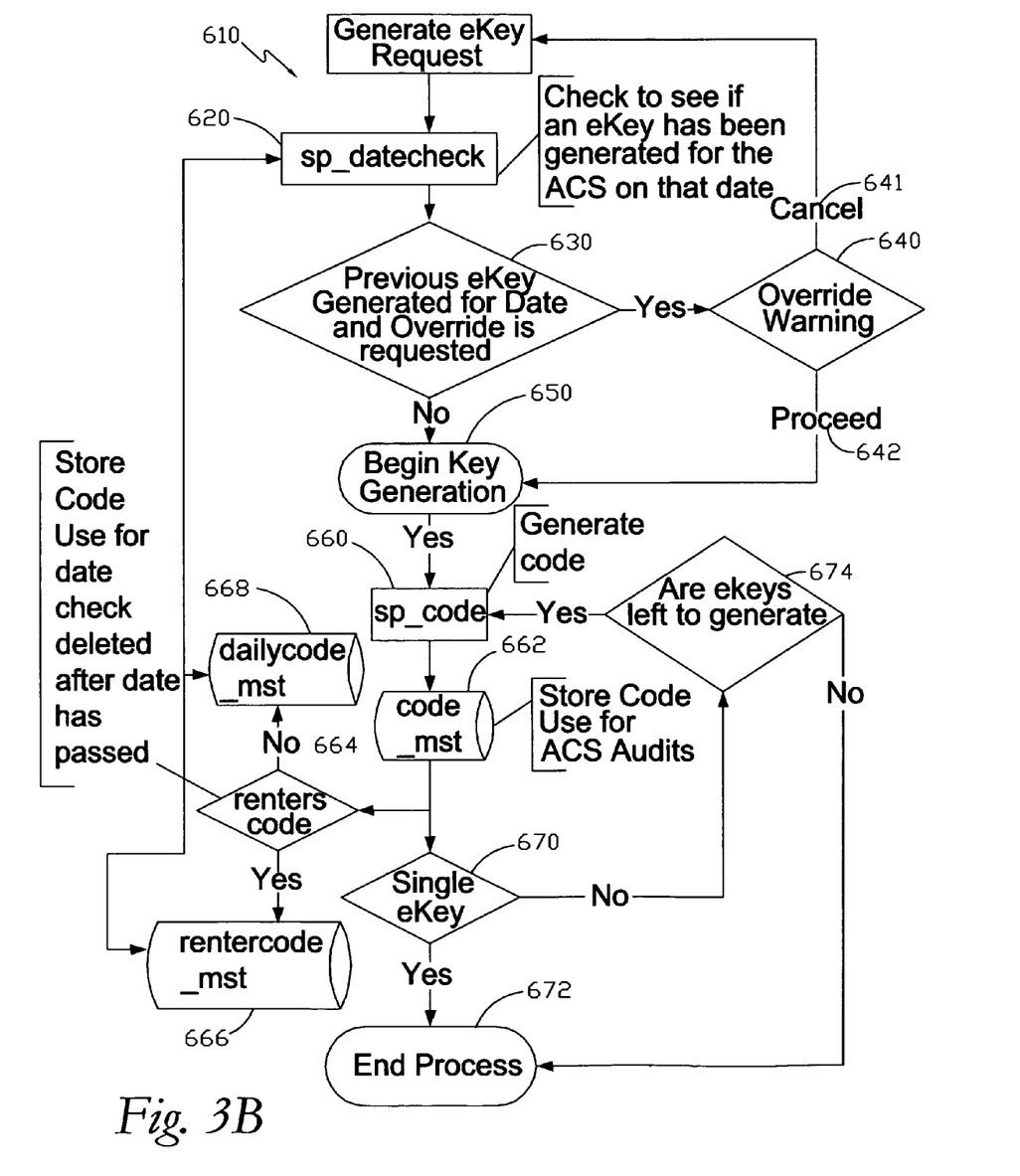
FIG. 3B is a high level flow chart illustrating generation of the electronic key by the electronic key server according to one preferred embodiment of the present invention.
Figure 3C:
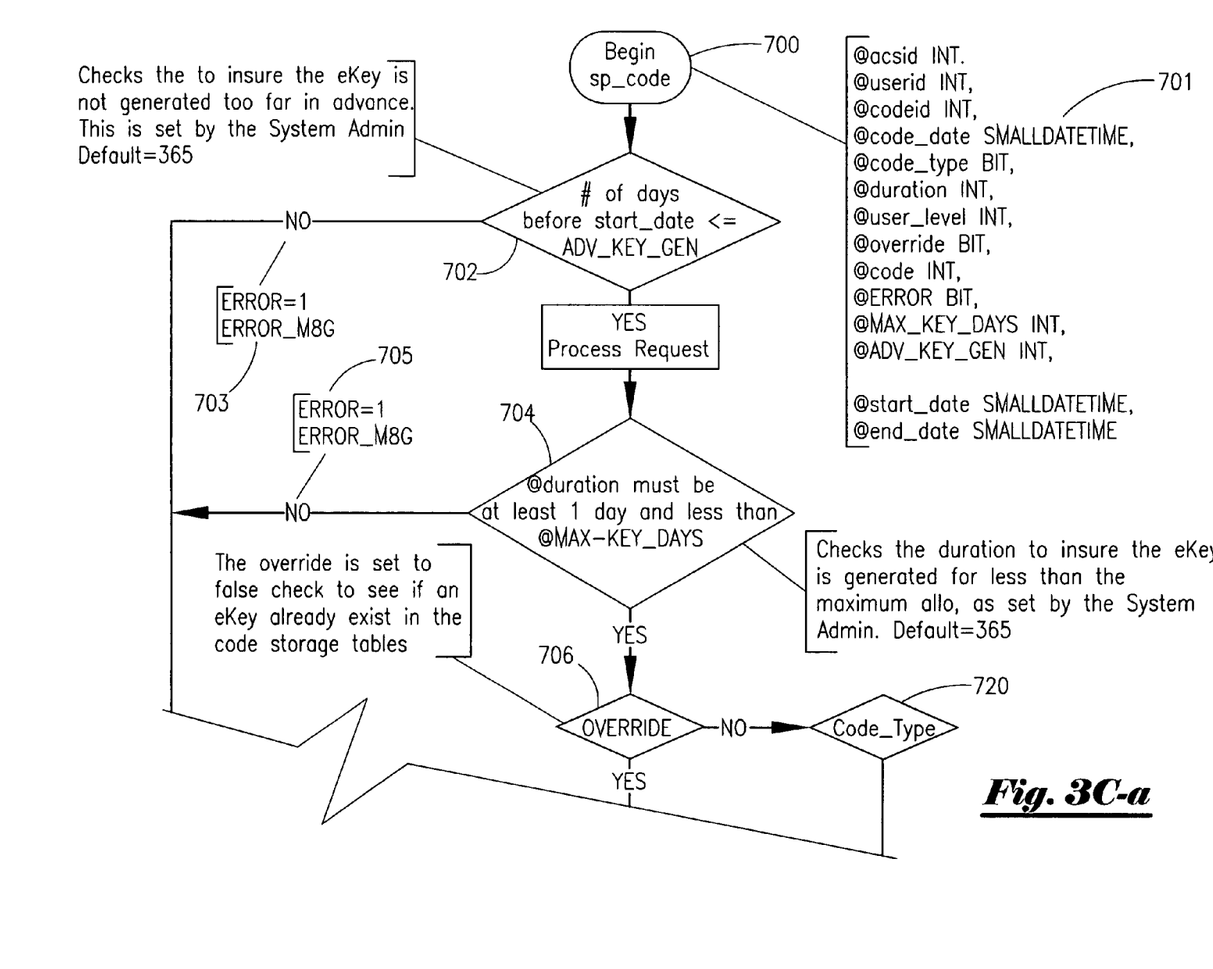

FIG. 3B illustrates in more detail generation of the electronic key by the electronic key server 44 according to a further preferred embodiment of the present invention. FIG. 3B illustrates, in a preferred embodiment, the electronic key generation step 350 shown in FIG. 3A.

As illustrated in FIG. 3B, the key generation system 40 will commence to generate an electronic key upon receipt of the requesting application 300 at the step 610 generate ekey request. In a preferred embodiment, the key generation system 40 will then perform a date check at step 620 to confirm whether or not an ekey has already been generated for the access control device 200 at the user selected property 6 as identified by the property identifier property ID in the requesting application 300. If, at step 620 a previous ekey had been generated for the date and an override is requested, an override warning will be sent at step 640. As indicated at step 640, the key generation system 40 and in particular the device management system in the server 44 will determine whether or not to cancel the requesting application 300 at step 641 or to proceed with the requesting application 300 at step 642. If the decision is made to proceed 642, generation of the electronic key will commence at step 650. Similarly, if no previous electronic key has been generated for the date and duration set out in the requesting application 300, then step 630 will proceed to begin key generation at step 650.

At step sp_code 660, the encryption 520 will take place. This may be done using a specific code such as the encryption code 52 discussed above according to a preferred embodiment where an encryption key 52 is used in the encryption algorithm and the decryption algorithm 226. At step 662, the encryption key 52 used will be stored in the device database 42 for future access control device audits.

At this stage, in a preferred embodiment, the system 40 will determine if the renters code corresponding to step 664 or if it is a maintenance code. If it is a renter's code, a renter code message will be created at step 666. If it is a maintenance code then a daily code will be generated at step 668 permitting daily use by a maintenance staff or a single day use by a maintenance staff as discussed above.

In step 670, a determination is made whether or not a single electronic key is to be made and if so, the process ends at step 670. If more than a single key is to be made, the process repeats at step 674 until no further keys need be generated at which time the process concludes at end process 672 from step 674.

FIGS. 3C-a and 3C-b shows a high level flow chart illustrating generation of a generated electronic key by the electronic key system 40 according to a further preferred embodiment. As illustrated in FIG. 3C-a at step 700, the specific code commences using the information 701 which may be obtained from the requesting application 300 and optionally for some information from the device database 42. At step 702, a determination is made of the number of days before the start date, which is one of the fields of the requesting application 300. If the number of days before the start date exceeds a predetermined limit ADV_KEY_GEN, then the requesting application 300 is requesting that the electronic key be generated too far in advance and an error message will be sent at step 703 ending the process at step 770. Alternatively, if at step 702 the number of days before the start date does not exceed the predetermined maximum ADV_KEY_GEN, the process will continue at step 704. At step 704, an assessment will be made whether or not the duration is at least one day and less than the maximum number of days. In other words, step 704 checks the duration to ensure the electronic key is not generated for less than the maximum allowable for the particular user desired property 6. The system administrator may set this or a default value of 365 days may be used. If the duration identifier duration does not fall within at least one day and less than the max MAX_KEY_DAYS predetermined value, then step 704 proceeds to send an error message 705 and ends the process at step 770. If the duration in the requesting application 300 as identified by the duration identifier duration falls within the range set by step 704, step 704 will proceed to step 706 to determine if an electronic key has already been generated for this time period. This is similar to step 630 discussed above with respect to FIG. 3B. The override 706 is set to false and will remain false and proceed to step 708 generation of the ekey if a review of the database 42 indicates that no electronic key has been previously generated. If, however, a review of the database 40 indicates that an electronic key has been generated for the specified dates and the user desires property 6, then step 706 will send a no signal and check the code type at step 720. If the code type is a 1, this may refer to a maintenance user in which case the system will proceed for a duration of less than one day with the understanding that the user will be maintenance user having only short access to the property 6 at step 724. If the code type is a 0 indicating that the user is a renter, the system 40 will determine if a renter code has been generated and if yes, increment the value by 1 at step 722.

At the generate ekey step 708, the encryption algorithm 520 will be run to generate the generated electronic key 20 and set the encryption key 52. The generated electronic key will then be returned to the user 8 as discussed above for future use at the access control device 200. At step 730, the user 8 inserts the generated electronic key 20 into the access control device 20 at the desired location 6. Also, the log key attempt 230 will make a record of the generated electronic key 20 accesses. At step 732, the code type will be determined again from the information embedded in the cyphertext 530 and extracted by the decrypt using symmetric algorithm 226. If the code is a 0 indicating the user is a renter, the time of entry of the renter will be stored at step 734. If the code is a 1 indicating a maintenance user, this information will be recorded at step 734 and may be used for future comparison and level checking including access. Step 770 ending the process will occur after the duration specified in the electronic key 20 by the duration identifier has exceeded the time determined by the internal clock 224 as discussed above.

It is understood that the system 10 and the key generation system 40 may be implemented by any person or group of persons. For instance, the system 10 and key generation system 10 may be implemented as part of a Multi-Client Reservation Engine ("MCRE") or by an individual on a For Rent by Owner ("FRBO") basis. As such, a user may access the key generation system 40 operated by a MCRE, FRBO or individual site through the network 30.

It is also understood that the term property 6 is not limited to a vacation property, but rather may include any type of property 6 and any type of location in a property 6 which has restricted access to the public. Typically, a property 6 will have entry points where an access device 200 may be installed to provide access to the user. Furthermore, it is understood that providing access to a property 6 also includes providing access to locations in a property 6 including providing access to a gated golf course, an exercise room, swimming pools, boat docks, locker rooms, rest rooms and storage facilities. Furthermore, it is understood that a property 6 may include a locker, a storage container or storage facility. Other areas of use include office server rooms, maintenance facilities and other rooms and facilities where the public may not normally have access or may not have access all of the time. It is also understood that a property 6 may include an apartment, room, condominium or any other location which is not generally accessed by the public. It is also understood that the property 6 may be any other type of room, location or facility which is accessed by the public during some hours and not accessed during other hours, such as to permit cleaning staff access to properties such as stores, shopping malls, offices and public facilities for cleaning, service and other general maintenance during off hours. It is also understood that providing access to a property 6 may include providing access through various entry points to the property 6 assuming the property 6 has different entry points.

It is also understood that a different electronic key may be required to provide access to the different entry points and/or locations of the property 6. For example, a different generated electronic key 20 may be used to gain access to the living quarters of a property 6, a car port or garage for the same property 6 and also the locker room for the same property 6. In this way, various locations within a property 6 may be rented at different rates and/or to two different users. In this way, the versatility of the system 10 can be increased.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

We claim:

1. A property management system for providing users access to properties at remote locations, said system comprising:

a key generation system for generating electronic keys in response to a requesting application from users, said requesting applications comprising a property identifier identifying a user selected property and a time identifier identifying when the user desires access to the user selected property, said key generation system comprising an encryption algorithm for encrypting information contained in the requesting application;

an access control device at each property for providing access to the property, each access control device having an access control identifier identifying the access control device and corresponding to the property identifier of the property to which the access control device can provide access, each access control device comprising a decryption algorithm, an internal clock for determining time and date, and an input method permitting the user to input an electronic key;

a network through which the user may access the key generation system to submit the requesting application and receive generated electronic keys;

wherein the key generation system receives the requesting application though the network from the user and using the encryption algorithm generates a generated electronic key which is forwarded to the user through the network, said generated electronic key containing encrypted information corresponding to at least the property identifier and the time identifier;

wherein upon the user inputting the generated electronic key into the input method of the access control device located at the user selected property, the access control device decrypts the generated electronic key using the decryption algorithm to extract the property identifier and time identifier, and said access control device permits the user access to the user selected property, if, and only if, the property identifier extracted from the generated key corresponds to the access control device identifier for the access control device at the user selected property, and, the time and date determined by the internal clock of the access control device at the user selected location is greater than the time identifier.

2. The property management system as defined in claim 1 wherein the encryption algorithm of the key generation system utilizes an encryption key; and wherein the decryption algorithm of each access control device utilize the encryption key to decrypt the generated electronic key and extract the property identifier and time identifier from the generated electronic key.

3. The property management system as defined in claim 2 wherein the decryption algorithm comprises a block cipher.

4. The property management system as defined in claim 1 wherein the requesting application comprises a duration identifier identifying the duration for which the user desires access the user selected property;

wherein the encryption algorithm generates the generated electronic key containing encrypted information corresponding to the duration identifier; and wherein the access control device extracts the duration identifier from the generated electronic key using the decryption algorithm and grants the user access to the user selected location while the time and date determined by the internal clock is less than the time identifier plus the duration identifier.

5. The property management system as defined in claim 4 further comprising:

other services servers connected to the network and the key generation system; and wherein the requesting application comprises an other services identifier identifying the other services selected by the user which the key generation system sends to the other services servers to reserve the other service.

6. The property management system as defined in claim 1 further comprising:
a device database comprising information regarding all of the properties at the remote locations which can be accessed by users through the generation system; and
wherein users can select the user selected property from the properties at the remote locations which can be accessed by the users by reviewing information forwarded through the network from the device database.

7. The property management system as defined in claim 1 wherein the encryption algorithm generates the generated electronic key containing a type identifier identifying a type of user, said type of user selected from the group consisting of a standard user and a maintenance user;
wherein for generated electronic keys having a type identifier identifying a standard user, the generated electronic key comprises a duration identifier indicative of the duration for which the standard user can access the user selected property; and
wherein for generated electronic keys having a type identifier identifying a maintenance user, the generated electronic key comprises a duration identifier indicative of the day and hours the maintenance user may access the user selected property.

8. The property management system as defined in claim 1 wherein the network comprises an Internet.

9. The property management system as defined in claim 1 wherein the network comprises a world wide web.

10. The property management system as defined in claim 1 wherein the network comprises a wide area network.

11. A method for providing users access to properties at remote locations, said method comprising:
inputting a requesting application by a user to a key generation system through a network, said requesting application comprising a property identifier identifying a user selected property selected from a plurality of properties which can be accessed by users by means of the key generation system, and, a time identifier identifying when the user desires access to the user selected property;
generating a generated electronic key by the key generation system utilizing an encryption algorithm, said generated electronic key containing encrypted information corresponding to at least the property identifier and the time identifier;
inputting the generated electronic key by a user into an access control device located at the user selected property;
decrypting, by the access control device at the user selected property, the generated electronic key using a decryption algorithm to extract information from the generated electronic key, said extracted information comprising the property identifier and the time identifier;
comparing at the access control device the property identifier to an access control device identifier identifying the access control device at the user selected property, and, comparing the time identifier to time and date determined by an internal clock at the access control device; and
providing the user access to the user selected property if, and only if, the property identifier corresponds to the access control device identifier for the access control device at the user selected property, and, the time and date determined by the internal clock of the access control device at the desired location is greater than the time identifier.

12. The method as defined in claim 11 wherein the encryption algorithm of the key generation system utilizes an encryption key; and
wherein the decryption algorithm of each access control device utilize the encryption key to decrypt the generated electronic key and extract the property identifier and time identifier from the generated electronic key.

13. The method as defined in claim 12 wherein the decryption algorithm comprises a block cipher.

14. The method as defined in claim 11 wherein the requesting application comprises a duration identifier indicative of the duration for which the user can access the user selected property;
and wherein the method further comprises:
generating, by the key generation system utilizing the encryption algorithm, the generated electronic key containing encrypted information corresponding to at least the property identifier, the time identifier and the duration identifier;
decrypting, by the access control device at the user selected property, the generated electronic key using the decryption algorithm to extract information from the generated electronic key, said extracted information comprising the property identifier, the time identifier and the duration identifier comparing at the access control device, the time identifier plus the duration identifier to time and date determined by an internal clock at the access control device; and
providing the user access to the user selected property while the time and date determined by the internal clock of the access control device at the desired location is less than the time identifier plus the duration identifier.

15. The method as defined in claim 11 further comprising:
transferring from the key generation system through the network to users information regarding all of the properties at the remote locations which can be accessed by users; and
wherein users can select the user selected property by reviewing information forwarded through the network from the device database.

16. The method as defined in claim 11 wherein the network is selected from the group consisting of an Internet, Intranet, a World Wide Web, a Local Area Network and a Wide Area Network.

17. A property management system for providing users access to properties at remote locations, said systems comprising:
at each property, an access control device for providing access to the property, each access control device comprising a decryption algorithm for converting cyphertext into plaintext, access information and a comparing unit for comparing the plaintext to the access information;
a key generation system for generating electronic keys to provide a user access to a user selected property in response to a requesting application from a user, said requesting application containing information regarding the user selected property, said key generation system comprising an encryption algorithm for converting plaintext into cyphertext;
a network through which users may access the key generation system to submit the requesting application and receive generated electronic keys;
wherein upon the key generation system receiving a valid requesting application from a user through the network, the key generation system generates a generated electronic key by utilizing the encryption algorithm to convert at least a portion of the information contained in the requesting application from plaintext to cyphertext to be contained in the generated electronic key, and forwards the generated electronic key to the user through the network;

wherein upon the user inputting the generated electronic key into the input method of the access control device located at the user selected property, the access control device utilizes the decryption algorithm to convert the cyphertext contained in the generated electronic key to plaintext; and wherein the comparing unit in the access control device compares the plaintext from the generated electronic key with its access information and said access control device permits the user access to the user selected property, if, and only if, the access information corresponds to the plaintext from the generated electronic key.

18. The system as defined in claim 17 wherein the portion of the information contained in the requesting application that is converted from plaintext to cyphertext comprises a property identifier identifying the user selected property and the access information in each access control device comprises an access control identifier indicative of the property to which the access control device can provide access; and wherein the comparing unit in the access control device compares the plaintext from the generated electronic key including the property identifier to the access information including the access control identifier and permits the user access to the user selected property, if, and only if, the access control identifier corresponds to the property identifier.

19. The system as defined in claim 18 further comprising, in each access control device, an internal clock for determining time and date;

wherein the portion of the information contained in the requesting application that is converted from plaintext to cyphertext comprises a time identifier identifying when a user desires access to the user selected property; and wherein the comparing unit in the access control device compares the plaintext from the generated electronic key to the time and date determined by the internal clock at the access control device, and, the access control device permits access to the user selected property, if, and only if, the time and date determined by the internal clock of the access control device at the user selected property is greater than the time identifier.

20. The system as defined in claim 19 wherein the portion of the information contained in the requesting application that is converted from plaintext to cyphertext comprises a duration identifier identifying a duration for which the user desires access to the user selected property; and wherein the comparing unit in the access control device compares the plaintext from the generated electronic key to the time and date determined by the internal clock at the access control device, and, the access control device permits the user access to the user selected property while the time and date determined by the internal clock of the access control device at the user selected property is less than that time identifier plus the duration identifier.

* * * * *